Sept. 30, 1924.  
W. THORNER  
1,510,114  
APPARATUS FOR THE OBJECTIVE DETERMINATON OF THE REFRACTION OF THE EYE  
Filed Aug. 8, 1921
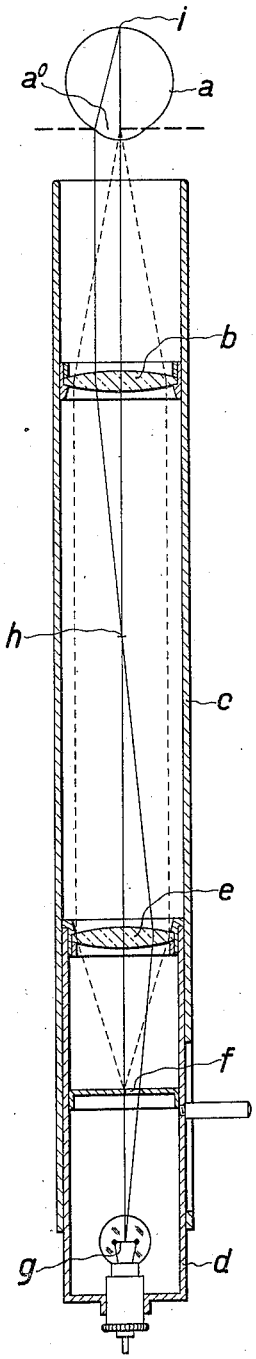
Inventor:  
Walther Thorner Patented Sept. 30, 1924.

1,510,114

UNITED STATES PATENT OFFICE.

WALTHER THORNER, OF BERLIN, GERMANY.

APPARATUS FOR THE OBJECTIVE DETERMINATION OF THE REFRACTION OF THE EYE.

Application filed August 8, 1921. Serial No. 490,719.

(GRANTED UNDER THE PROVISIONS OF THE ACT OF MARCH 3, 1921, 41 STAT. L., 1313.)

*To all whom it may concern:*

Be it known that I, WALTHER THORNER, a citizen of the German Republic, and residing at Berlin, Germany, have invented a new and useful Apparatus for the Objective Determination of the Refraction of the Eye (for which I have filed an application in Germany, February 11, 1919, and in England, January 8, 1921), of which the following is a specification.

The present invention relates to that class of objective determinations of the refraction of the eye, which are carried out with the aid of focal illumination of the retina, i. e. with which the sharp image of the filament of an electric incandescent lamp is produced on the retina. These methods have the drawback, that the small image of the filament of the incandescent lamp is covered for the greatest part by the reflection of the cornea.

In the present invention the said drawback is avoided, by combining the focal illumination of the retina with a method, affording in itself an image, free from reflections, of the background of the eye, or in other words, by inserting the device, which serves for producing the sharp image of a source of light and for displacing the same according to the different states of refraction, into the illuminating system of an ophthalmoscope free from reflections. As, thereby, only a small portion of the retina is illuminated, the pupil is so little contracted, that it is always possible, also without artificially dilating the pupil, to determine the refraction, viz. in the vicinity of the yellow spot. The source of light may be formed, e. g., by the filament of an electric incandescent lamp or by a small aperture, illuminated by a lamp.

The desired object cannot be attained by disposing a source of light in front of the illuminating tube of an opthalmoscope free from reflections. For, there always exists a state of refraction for which the plane conjugated to the retina lies at infinity, which would therefore require a very large displacement of the source of light. Only in the single case, that the pupillary plane of the eye would be conjugated to infinity, finite displacement of the source of light would always be sufficient. This is, however, impossible because the pupillary plane must be conjugated, for attaining the freedom from reflections, to that plane in which the real stopping down-device is disposed.

The said difficulty may be overcome by dividing the illuminating system of the opthalmoscope, free from reflections, into a stationary and a shiftable part. In order that for any positions the diaphragm will be sharply imaged in the pupil of the eye, it is necessary that in each of the pencils by which the diaphragm is imaged, the rays forming the pencil be parallel to each other between the stationary and the shiftable part; the stop should therefore lie in the focal plane of the shiftable and the pupil in the focal plane of the stationary part of the system. The source of light is rigidly fixed to the shiftable part of the system, viz. in such a way that the shiftable part of the system collects the rays of the source of light right through the diaphragm and produces a real image of the source of light at any distance. In case the source of light is formed by a small aperture, illuminated by a lamp, the lamp may either be fixed or shiftable along with the said aperture. With the objective determination of refraction, the said real image moves to and fro within the stationary system as the shiftable system is displaced. The pupil of the examined eye being in the focal plane of the stationary system, to each diopter of ametropia there corresponds a constant displacement. The case, that the source of light could not be adjusted accordingly for any certain ametropia, is impossible with the said arrangement.

In order to be able to easily determine any degree of astigmatism as well, the source of light can be formed like a line and the complete device can be so disposed as to be rotatable about the optical axis of the observation tube of the ophthalmoscope.

The annexed drawing shows schematically a constructional example of the invention. The eye to be examined is denoted by $a$, whilst the stationary part of the illuminating system of the opthalmoscope, free from reflections, is indicated by a collective lens $b$. The pupil $a^0$ of $a$ lies approximately in the focal plane of the lens $b$. In a tube $c$, within which the lens $b$ is fixed, a second tube $d$ is displaceably disposed, carrying at its inner end a collective lens $e$, in the focal plane of which is fixed a crescent-shaped diaphragm $f$ and beyond the latter, a filament-shaped incandescent lamp $g$. The real image of the filament of the incandescent lamp produced by the lens $e$ lies in the point $h$. When the tube $d$ is shifting, the main image always remains equidistant from the lens $e$. In the position shown in the drawing which relates to an emmetropic eye, the image lies in the focal point of the lens $b$ and is sharply imaged by the lens $b$ on the point $i$ of the retina of the eye $a$. The said sharp image is now observed through the observation tube of the opthalmoscope, free from reflections, which is not shown in the drawing. The diaphragm $f$ is sharply imaged in the pupil $a^0$ in any position of the tube $d$. The dotted lines represent the path of rays, relating to the image of the diaphragm $f$, and the continuous lines that relate to the image of the filament $g$.

I claim:

1. In an apparatus for the objective determination of the refraction of the eye an illuminating tube of an ophthalmoscope, the said tube consisting of a stationary part containing a collective lens system and a part displaceable in the optical axis, this latter part containing a source of light displaceable in the optical axis of the said tube, a diaphragm and a second collective lens system, the diaphragm lying in the focal plane of the second collective system, and the source of light lying at a distance from the second collective system, greater than the focal length of this system.

2. In an apparatus for the objective determination of the refraction of the eye an illuminating tube of an ophthalmoscope, the said tube consisting of a stationary part containing a collective lens system, the focal plane of which system lies in the place of the pupil of the eye to be observed, and a part displaceable in the optical axis, this latter part containing a source of light displaceable in the optical axis of the said tube, a diaphragm and a second collective lens system, the diaphragm lying in the focal plane of the second collective system and the source of light lying at a distance from the second collective system, greater than the focal length of this system.

3. In an apparatus for the objective determination of the refraction of the eye an illuminating tube of an ophthalmoscope and an electric incandescent lamp, containing a straight filament perpendicular to the optical axis of the said tube and being displaceable in the said optical axis, the said tube being rotatably disposed about its optical axis.

WALTHER THORNER.